(12) United States Patent
Wataru et al.

(10) Patent No.: US 10,938,293 B2
(45) Date of Patent: Mar. 2, 2021

(54) VOLTAGE CONVERTING UNIT

(71) Applicant: Yazaki Corporation, Tokyo (JP)

(72) Inventors: Kazuhisa Wataru, Makinohara (JP); Katsuyuki Iwasaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 326 days.

(21) Appl. No.: 15/960,660

(22) Filed: Apr. 24, 2018

(65) Prior Publication Data

US 2019/0028017 A1  Jan. 24, 2019

(30) Foreign Application Priority Data

Jul. 19, 2017  (JP) ............................. JP2017-139635

(51) Int. Cl.
| | |
|---|---|
| *H02M 1/08* | (2006.01) |
| *H02J 7/00* | (2006.01) |
| *H02J 7/14* | (2006.01) |
| *H02J 1/08* | (2006.01) |
| *B60R 16/03* | (2006.01) |
| *H02M 1/00* | (2006.01) |

(52) U.S. Cl.
CPC ............... *H02M 1/08* (2013.01); *H02J 7/00* (2013.01); *H02J 7/1423* (2013.01); *B60R 16/03* (2013.01); *H02J 1/082* (2020.01); *H02M 2001/0009* (2013.01)

(58) Field of Classification Search
CPC .... H02M 1/08; H02M 2001/0009; H02J 7/00; H02J 7/1423; H02J 1/082; H02J 3/32; H02J 3/383; H02J 3/386; H02J 9/06; H02J 9/002; B60R 16/03; Y02E 10/563

USPC .......................................................... 307/19
See application file for complete search history.

(56) References Cited

U.S. PATENT DOCUMENTS

| | | | | |
|---|---|---|---|---|
| 5,362,942 | A * | 11/1994 | Vanderslice, Jr. ........ | H02J 7/00 219/209 |
| 8,817,501 | B1 * | 8/2014 | Low ...................... | H02M 3/073 363/60 |
| 10,811,897 | B2 * | 10/2020 | Maekawa ............. | H01M 10/48 |
| 2003/0067287 | A1 | 4/2003 | Morgen | |
| 2006/0097577 | A1 | 5/2006 | Kato et al. | |
| 2007/0229028 | A1 | 10/2007 | Hashimoto | |
| 2008/0278005 | A1 * | 11/2008 | Chambon ............... | H02J 9/005 307/66 |
| 2009/0189571 | A1 * | 7/2009 | Lai ....................... | H02M 1/4225 320/162 |

(Continued)

FOREIGN PATENT DOCUMENTS

| | | |
|---|---|---|
| GB | 2 371 376 A | 7/2002 |
| JP | 2002-320338 A | 10/2002 |

(Continued)

*Primary Examiner* — Alfonso Perez Borroto
(74) *Attorney, Agent, or Firm* — Sughrue Mion, PLLC

(57) ABSTRACT

Provided is a voltage converting unit including: a voltage converter capable of bidirectionally supplying electrical power between a first power system and a second power system; and a bypass switch disposed in parallel to the voltage converter. The voltage converter includes: a detector detecting a difference in voltage between the first power system and the second power system; and a switch controller controlling switching of the bypass switch on the basis of the difference in voltage in accordance with a predetermined rule.

14 Claims, 2 Drawing Sheets

(56) References Cited

U.S. PATENT DOCUMENTS

| | | | | |
|---|---|---|---|---|
| 2013/0200699 | A1* | 8/2013 | Origane | H02J 1/04 307/10.6 |
| 2014/0306533 | A1* | 10/2014 | Paquin | H02J 1/00 307/52 |
| 2015/0066228 | A1* | 3/2015 | Clifton | H02J 3/382 700/295 |
| 2015/0183329 | A1* | 7/2015 | Nakaya | B60L 53/14 307/9.1 |
| 2016/0137092 | A1* | 5/2016 | Thieme | B60L 1/003 307/10.6 |
| 2016/0336767 | A1* | 11/2016 | Zane | H02J 7/0068 |
| 2016/0368385 | A1* | 12/2016 | Yim | B60L 7/14 |
| 2017/0141576 | A1* | 5/2017 | Gutenmann | H02J 3/383 |
| 2017/0163170 | A1* | 6/2017 | Tahata | H02M 7/483 |
| 2017/0250419 | A1* | 8/2017 | Yamaue | H01M 8/04231 |
| 2017/0302105 | A1* | 10/2017 | Toyoda | H02M 7/217 |
| 2018/0037121 | A1* | 2/2018 | Narla | B60L 53/51 |
| 2018/0102647 | A1* | 4/2018 | Ohnishi | H02J 3/0073 |
| 2018/0152046 | A1* | 5/2018 | Toyoda | H02J 9/062 |
| 2018/0212460 | A1* | 7/2018 | Shibata | H02J 9/061 |
| 2018/0337536 | A1* | 11/2018 | Li | H02J 7/0091 |
| 2019/0020281 | A1* | 1/2019 | Yang | H02M 3/3376 |
| 2019/0181677 | A1* | 6/2019 | Toyoda | H02M 7/48 |
| 2019/0252908 | A1* | 8/2019 | Takita | H02J 7/1423 |
| 2019/0334376 | A1* | 10/2019 | Toyoda | H02J 9/062 |
| 2019/0379269 | A1* | 12/2019 | Huntgeburth | H02K 47/04 |

FOREIGN PATENT DOCUMENTS

| | | |
|---|---|---|
| JP | 2004-328988 A | 11/2004 |
| JP | 2007-267509 A | 10/2007 |
| JP | 2016-226199 A | 12/2016 |
| JP | 2017-88086 A | 5/2017 |

* cited by examiner

VOLTAGE CONVERTING UNIT

BACKGROUND

Technical Field

The present invention relates to a voltage converting unit including a voltage converter.

Related Art

Recent automobiles and other automatic vehicles each include two power systems having different voltages from each other. For example, a power system of 48 V is mounted in addition to a conventional power system of 12 V.

Mutual transfer of electric power between the two systems having different voltages allows one of the power systems to compensate for a shortage of power in the other power system in failure. The mutual transfer of electric power also allows a battery of one of the power systems to be charged with a battery of the other power system. To achieve the mutual transfer of electric power, the use of bidirectional voltage converters such as bidirectional DCDC converters has been proposed.

Patent Literature 1: JP 2016-226199 A

SUMMARY

FIG. 2 illustrates a bidirectional DCDC converter 210 disposed between a power system A 220 and a power system B 230. With reference to FIG. 2, the power system A 220 includes a first load 221, a main battery (Pb) 222, and an alternator 223. The power system B 230 includes a sub-battery (Lib) 231 and a second load 232.

Herein, a voltage Vb of the power system B 230 is higher than a voltage Va of the power system A 220. It is to be noted that the voltages Va and Vb are variable depending on conditions of the batteries, loads, and other components of the respective power systems.

For power supply from the power system A 220 to the power system B 230, the bidirectional DCDC converter 210 increases the voltage Va to around the voltage Vb. In contrast, for power supply from the power system B 230 to the power system A 220, the bidirectional DCDC converter 210 reduces the voltage Vb to around the voltage Va.

For example, in a case where a difference between the voltage Vb of the power system B 230 and the voltage Va of the power system A 220 is small, voltage conversion is not necessarily required for the power supply from the power system B 230 to the power system A 220.

In such a case, power supply via the bidirectional DCDC converter 210 consumes electric power to operate the bidirectional DCDC converter 210, resulting in a waste of electric power. To contribute to an improvement in fuel efficiency of vehicles, for example, it is preferred to reduce power consumption in a voltage converter, such as the bidirectional DCDC converter 210, during the power transfer.

An object of the present invention is thus to reduce power consumption in a voltage converter during power transfer between power systems.

To address the problems described above, a voltage converting unit according to an aspect of the present invention includes: a voltage converter capable of bidirectionally supplying electric power between a first power system and a second power system; and a bypass switch disposed in parallel to the voltage converter. The voltage converter includes: a detector detecting a difference in voltage between the first power system and the second power system; and a switch controller controlling switching of the bypass switch on the basis of the difference in voltage in accordance with a predetermined rule.

If the difference in voltage satisfies a condition defined by the rule, the power supply can be performed without the voltage converter. This allows for a reduction in power consumption in the voltage converter during the power transfer between the power systems.

The detector may further detect a current flowing between the first power system and the second power system, and the switch controller may further control switching of the bypass switch on the basis of the current.

This configuration is designed for the case where power consumption varies depending on currents flowing between the first power system and the second power system.

Additionally, the detector may further detect a temperature, and the switch controller may further control switching of the bypass switch on the basis of the temperature.

This configuration is designed for the case where the power consumption varies depending on temperatures.

The rule may be determined through a comparison between power consumption in the bypass switch while the bypass switch is turned on and power consumption in the voltage converter while the bypass switch is turned off.

Accordingly, a path that requires less power consumption is selected from the path via the voltage converter and the path via the bypass switch.

The rule may be further determined through a comparison between operational stability of the voltage converter while the bypass switch is turned on and operational stability of the voltage converter while the bypass switch is turned off.

This can prevent unstable operation of the voltage converter.

According to embodiments of the present invention, power consumption in a voltage converter can be reduced during power transfer between power systems.

DETAILED DESCRIPTION

Figure 1:
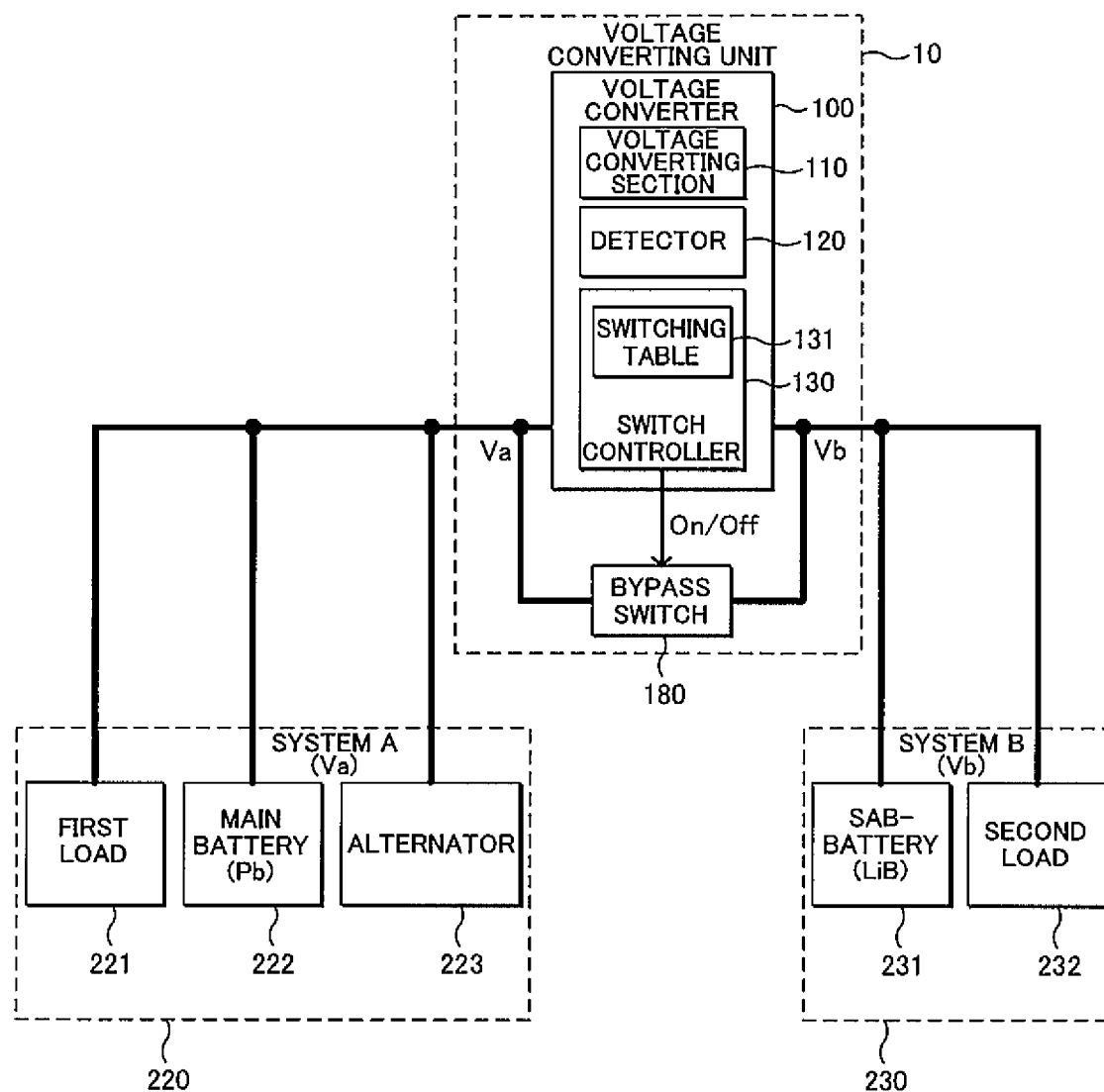
FIG. 1 is a configurational diagram of a voltage converting unit according to an embodiment of the present invention.
Figure 2:
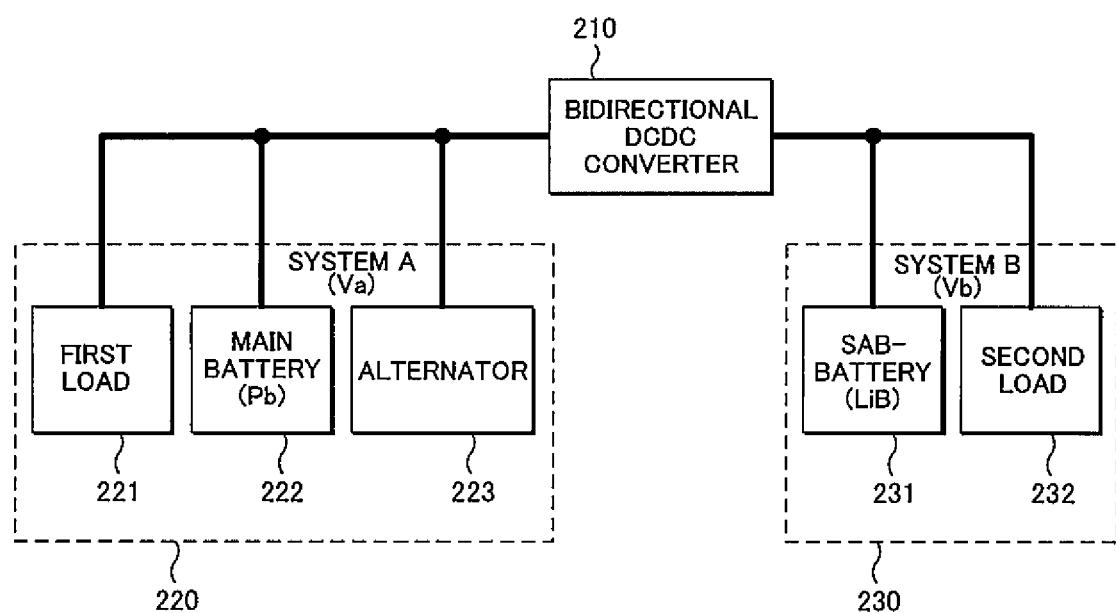
FIG. 2 illustrates a bidirectional DCDC converter disposed between a power system A and a power system B.

Embodiments of the present invention will now be described in detail with reference to the drawings. FIG. 1 is a configurational diagram of a voltage converting unit 10 according to an embodiment of the present invention. With reference to FIG. 1, the voltage converting unit 10 is disposed between a power system A 220 and a power system B 230 and transfers electric power between the power system A 220 and the power system B 230. Herein, a connection terminal coupled to the power system A 220 is referred to as "connection terminal A", and a connection terminal coupled to the power system B 230 is referred to as "connection terminal B".

The power system A 220 includes a first load 221, a main battery (Pb) 222, and an alternator 223. The power system B 230 includes a sub-battery (Lib) 231 and a second load 232. A voltage Vb of the power system B 230 is higher than a voltage Va of the power system A 220. It is to be noted that the voltages Va and Vb are variable depending on conditions of the batteries, loads, and other components of the respective power systems.

The voltage converting unit 10 includes a voltage converter 100 and a bypass switch 180. The bypass switch 180 may be a semiconductor switch, for example, and is coupled in parallel to the voltage converter 100. The bypass switch 180 has an on-resistance while being turned on. In view of a reduction in power consumption, a lower on-resistance is preferred.

As illustrated in FIG. 1, the voltage converter 100 includes a voltage converting section 110, a detector 120, and a switch controller 130. The switch controller 130 includes a switching table 131.

The voltage converting section 110 performs bidirectional voltage conversion between the connection terminal A and the connection terminal B. The voltage converting section 110 may be a bidirectional DCDC converter, for example. The voltage converting section 110 may have any voltage converting scheme. Examples of the scheme may include a linear regulator scheme, a chopper circuit scheme, and a switching regulator scheme.

The detector 120 detects physical quantities inside and outside the voltage converting unit 10. The physical quantities to be detected may be a voltage Va of the power system A 220 coupled to the connection terminal A, and a voltage Vb of the power system B 230 coupled to the connection terminal B. The detector 120 may further detect a temperature at and in the vicinity of the voltage converting unit 10. Additionally, the detector 120 may detect a current flowing between the power system A 220 and the power system B 230 via the voltage converting unit 10.

If the voltage conversion at the voltage converting unit 10 is not needed, the switch controller 130 performs on/off control of the bypass switch 180 on the basis of a result of the detection by the detector 120. It is to be noted that the need for the voltage conversion at the voltage converting unit 10 may be determined on the basis of an instruction from a host device, for example. The switch controller 130 controls on/off of the bypass switch 180 with reference to the switching table 131.

The switching table 131 defines on/off of the bypass switch 180 in a correlation with a difference in voltage dV between the voltage Va and the voltage Vb. In detail, if the difference in voltage dV between the voltage Va and the voltage Vb falls within a range defined by the switching table 131, the switch controller 130 turns on the bypass switch 180, and otherwise turns off the bypass switch 180.

The switch controller 130 may be a processor such as a microcomputer, for example. The switching table 131 may be stored in a memory in a microcomputer, for example.

While the bypass switch 180 is turned off, power supply between the power system A 220 and the power system B 230 via the voltage converting unit 10 is performed via the voltage converter 100. In this case, power required to operate the voltage converting section 110 corresponds to power consumption.

While the bypass switch 180 is turned on, the power supply between the power system A 220 and the power system B 230 via the voltage converting unit 10 is performed via the bypass switch 180. Since the bypass switch 180 has an on-resistance, the product of a current through the bypass switch 180 and the difference in voltage dV, or the value obtained from dividing the square of the difference in voltage dV by the on-resistance, corresponds to power consumption.

The switching table 131 defines on/off of the bypass switch 180 in a correlation with a difference in voltage dV to reduce power consumption. In detail, power consumption while the bypass switch 180 is turned off and power consumption while the bypass switch 180 is turned on are preliminary determined, for each difference in voltage dV, from the specifications, measured values, or other parameters of the voltage converting section 110 and the bypass switch 180 to prepare the switching table 131. With reference to the switching table 131, a path requiring less power consumption is selected.

For example, if the specifications are the voltage converting section 110 of 3 kW, a difference in voltage of dV1, and a conversion efficiency of the voltage converting section 110 of 97%, the power consumption in the voltage converting section 110 is 90 W (calculated by 3 kW×(1−0.97)). In contrast, if the bypass switch 180 has an on-resistance of 1 mΩ, the power consumption in the bypass switch 180 is (dV1^2/0.001) W. If the power consumption in the bypass switch 180 is less than that in the voltage converting section 110, the switching table 131 defines that the bypass switch 180 is to be turned on at the difference in voltage dV1.

Accordingly, the switching table 131 may follow a format in which the bypass switch 180 is turned on if the relations V1<dV<V2 and V3<dV<V4 are satisfied, for example. It is needless to mention that the switching table 131 may be defined by another format.

The voltage converting section 110 may exhibit unstable behavior while the difference in voltage dV is small, for example. The voltage converting section 110 may repeat step-up and step-down operations, for example, resulting in an increase in ripple voltage and fluctuation in voltage.

To prevent the unstable behavior, the switching table 131 may define that the bypass switch 180 is to be turned on if the difference in voltage dV falls within a range where the voltage converting section 110 causes unstable behavior, regardless of the amount of power consumption. This can prevent unstable behavior of the voltage converting section 110. In this case, the switching table 131 may contain an additional rule which defines that the bypass switch 180 is to be turned on if the relation V5<dV<V6 is satisfied.

The power consumption in the voltage converting section 110 and that in the bypass switch 180 may be affected by factors other than the difference in voltage dV. For example, in a case where the power consumption varies depending on ambient temperatures, a switching table 131 is prepared for each ambient temperature.

In this case, the detector 120 detects an ambient temperature, and the switch controller 130 performs on/off control of the bypass switch 180 on the basis of one of the switching tables 131 that corresponds to the detected ambient temperature. For example, a switching table 131 may be prepared for every five degrees in temperature, and one of the switching tables 131 that corresponds to the detected temperature is used.

In another case where the power consumption varies depending on currents flowing through the voltage converting section 110, the switching table 131 is prepared for each current. In this case, the detector 120 detects a current flowing between the connection terminal A and the connection terminal B of the voltage converting unit 10, and the switch controller 130 performs on/off control of the bypass switch 180 on the basis of one of the switching tables 131 that corresponds to the detected current.

In still another case, the switching table 131 may be prepared for each type of batteries of the power systems. For example, a switching table 131 may be prepared for each type (lead, lithium ion, and capacitor, etc.) of the sub-battery 231 of the power system B 230.

According to the voltage converting unit 10 of the embodiment described above, the detector 120 detects a difference in voltage between the power systems, and the switch controller 130 controls switching of the bypass switch 180 on the basis of the difference in voltage. This allows for power supply without the voltage converting section 110, resulting in a reduction in power consumption in the voltage converter 100 during power transfer between the power systems.

REFERENCE SIGNS LIST

10 voltage converting unit
100 voltage converter
110 voltage converting section
120 detector
130 switch controller
131 switching table
180 bypass switch
220 power system A
222 main battery
230 power system B
231 sub-battery

What is claimed is:

1. A voltage converting unit comprising:
   a voltage converter capable of bidirectionally supplying electric power between a first power system and a second power system; and
   a bypass switch disposed in parallel to the voltage converter, wherein
   the voltage converter includes:
      a detector detecting a difference in voltage between the first power system and the second power system; and
      a switch controller controlling switching of the bypass switch based on the difference in voltage in accordance with a predetermined rule.

2. The voltage converting unit according to claim 1, wherein
   the detector further detects a current flowing between the first power system and the second power system, and
   the switch controller further controls switching of the bypass switch based on the current.

3. The voltage converting unit according to claim 1, wherein
   the detector further detects a temperature, and
   the switch controller further controls switching of the bypass switch based on the temperature.

4. The voltage converting unit according to claim 2, wherein
   the detector further detects a temperature, and
   the switch controller further controls switching of the bypass switch based on the temperature.

5. The voltage converting unit according to claim 1, wherein the rule is determined through a comparison between power consumption in the bypass switch while the bypass switch is turned on and power consumption in the voltage converter while the bypass switch is turned off.

6. The voltage converting unit according to claim 2, wherein the rule is determined through a comparison between power consumption in the bypass switch while the bypass switch is turned on and power consumption in the voltage converter while the bypass switch is turned off.

7. The voltage converting unit according to claim 3, wherein the rule is determined through a comparison between power consumption in the bypass switch while the bypass switch is turned on and power consumption in the voltage converter while the bypass switch is turned off.

8. The voltage converting unit according to claim 4, wherein the rule is determined through a comparison between power consumption in the bypass switch while the bypass switch is turned on and power consumption in the voltage converter while the bypass switch is turned off.

9. The voltage converting unit according to claim 5, wherein the rule is further determined through a comparison between operational stability of the voltage converter while the bypass switch is turned on and operational stability of the voltage converter while the bypass switch is turned off.

10. The voltage converting unit according to claim 6, wherein the rule is further determined through a comparison between operational stability of the voltage converter while the bypass switch is turned on and operational stability of the voltage converter while the bypass switch is turned off.

11. The voltage converting unit according to claim 7, wherein the rule is further determined through a comparison between operational stability of the voltage converter while the bypass switch is turned on and operational stability of the voltage converter while the bypass switch is turned off.

12. The voltage converting unit according to claim 8, wherein the rule is further determined through a comparison between operational stability of the voltage converter while the bypass switch is turned on and operational stability of the voltage converter while the bypass switch is turned off.

13. The voltage converting unit according to claim 1, wherein the voltage converter is configured to:
   determine, according to the predetermined rule, whether a first power consumption by supplying, by the voltage converter, the electric power between the first power system and the second power system is greater than a second power consumption by supplying, by the bypass switch, the electric power between the first power system and the second power system; and
   switching on the bypass switch in response to determining that the second power consumption is less than the first power consumption.

14. The voltage converting unit according to claim 1, wherein the voltage converter is a bidirectional DC/DC converter.

* * * * *